United States Patent
Mendelson et al.

(10) Patent No.: US 6,450,361 B1
(45) Date of Patent: Sep. 17, 2002

(54) LOW PRESSURE COOKER WITH PIVOTING LATCH HANDLES

(76) Inventors: Lewis A. Mendelson, 9830 Briar, Overland Park, KS (US) 66207; Blaise M. Wooderson, 15820 W. 131st St., Olathe, KS (US) 66022

( * ) Notice: Subject to any disclaimer, the term of this patent is extended or adjusted under 35 U.S.C. 154(b) by 14 days.

(21) Appl. No.: 09/837,290

(22) Filed: Apr. 18, 2001

(51) Int. Cl.[7] .............................................. B65D 45/00
(52) U.S. Cl. ..................... 220/573.1; 220/202; 220/316
(58) Field of Search .............................. 220/573.1, 756, 220/912, 243, 244, 314, 315, 318, 323, 324, 202, 203, 203.7, 203.19, 203.22, 316

(56) References Cited

U.S. PATENT DOCUMENTS

| | | |
|---|---|---|
| 966,865 A | 8/1910 | Schuyler |
| 1,515,091 A | 11/1924 | Brower et al. |
| 1,966,681 A * | 7/1934 | Petersen et al. ......... 220/202 X |
| 2,310,348 A | 2/1943 | Blears |
| 2,410,214 A * | 10/1946 | Higginson et al. ...... 220/316 X |
| 2,499,828 A | 3/1950 | Kuriloff |
| 2,565,269 A | 8/1951 | Saxton |
| 2,939,606 A * | 6/1960 | Durbin ..................... 220/573.1 |
| 3,471,054 A | 10/1969 | Ostrowsky et al. |
| 3,765,563 A | 10/1973 | Kraft et al. |
| 4,024,982 A | 5/1977 | Schultz |
| 4,423,825 A | 1/1984 | Baumgarten |
| 4,932,550 A | 6/1990 | Moucha |
| 5,317,959 A * | 6/1994 | Beluzzi ................... 220/316 X |
| 5,638,984 A | 6/1997 | Munari |
| 5,687,870 A | 11/1997 | Carlite et al. |
| 5,957,323 A | 9/1999 | Terracciano et al. |
| 6,105,808 A | 8/2000 | Mendonca |

FOREIGN PATENT DOCUMENTS

EP 0 291 641 11/1988

* cited by examiner

Primary Examiner—Steven Pollard
(74) Attorney, Agent, or Firm—Shughart Thomson & Kilroy P.C.

(57) ABSTRACT

A low pressure cooker is disclosed having a pan and a pressurizable lid. Latch handles that pivot about a generally vertical axis are provided for latching the pressurizable lid in position relative to the pan. The cooker may also include a non-pressurizable lid that cannot be latched in position using the latch handles.

26 Claims, 5 Drawing Sheets ously, all references being made to specific embodiments described in this application. These terms and these references are not intended to limit the scope of the invention in any way.

LOW PRESSURE COOKER WITH PIVOTING LATCH HANDLES

BACKGROUND OF THE INVENTION

1. Field of the Invention

The invention relates to the field of cookware, and in particular to a low pressure cooker having pivoting latch handles for locking the lid in position relative to the pan.

2. Description of the Related Art

In today's world of two breadwinner households, families have less time to prepare meals and are continually looking for faster methods of cooking. One way to accelerate cooking time is with the use of a pressure cooker. A pressure cooker in its simplest terms is a cooking pot having a lid, which can be sealed so that pressure will build up inside the pot when it is heated. In order to prevent the pot from over-pressurizing and exploding, the pressure cooker must be provided with a pressure relief valve.

Pressure cookers have been known for many years. A common type of pressure cooker employs a lid having a plurality of circumferentially spaced flanges, which interlock, with similar flanges on the cooker body or pan when the lid is rotated relative to the pan. A lid with this type of locking mechanism is known as a "bayonet" lid. Bayonet style pressure cookers often operate at pressures of 5–15 psig. These cookers do an excellent job of cooking, however many people are afraid to operate them for fear that they may explode.

One problem with such pressure cookers is that attempting to open the lid while the cooker is still pressurized can injure a cook. A lid removed in this fashion can be propelled away from the cooker with sufficient force to cause substantial injury. Steam and hot liquid, which can cause burns, can also be expelled from the cooker. In order to prevent this type of injury, it is advisable that these high-pressure bayonet type cookers be equipped with an interlock system, which prevents the lid from being removed while the cooker is pressurized. Numerous interlock systems of this type have been the subject of U.S. patents, some examples being U.S. Pat. Nos. 3,765,563; 4,423,825; 4,932,550; and 6,105,808. These interlock systems add significantly to the safety of the cookers, but they also add to the expense and complexity of the devices, and, of course, cannot be released to open until the pressure inside the cooker has decreased to a safe level.

The dangers associated with prior art pressure cookers are directly related to the high pressures that they employ for cooking. A cooker operating at substantially less pressure can still accelerate cooking time significantly, while be much less dangerous and less intimidating to operate. A low pressure cooker can also employ a more simple and convenient form of lid closure mechanism because the lid can be safely unlatched even while under pressure.

SUMMARY OF THE INVENTION

The present invention comprises a low pressure cooker including a pan having a bottom wall and a sidewall extending upward from the bottom wall to a top edge. The top edge of the sidewall defines a pan opening and includes a flange, which extends outwardly from the sidewall. The flange includes an upper sealing surface and an outer lip spaced upwardly from the upper sealing surface. The pan opening is selectively covered by a pressure cooker lid sized and shaped to be positionable on the sidewall flange in covering relation with the pan opening. The pressure cooker lid includes a pressure relief valve having a preset relief pressure. An elastomeric seal is positioned between the outer edge of the pressure cooker lid and the upper sealing surface of the sidewall flange.

The pressure cooker lid is latched in place relative to the pan by a plurality of latch handles having a fixed member secured to the sidewall proximate its top edge and a latching member including a latch dog. The latching members are each attached to the respective fixed members so as to be pivotable about a generally vertical axis between a latched position wherein the latch dog overlaps a portion of the pressure cooker lid and an unlatched position wherein the latch dog is clear of the pressure cooker lid. Each latching member includes a glide, which depends from the latch dog and engages the pressure cooker lid as the latching member is moved into the latched position. The glide pushes the pressure cooker lid downwardly, forcing the elastomeric seal into sealing engagement with the flange sealing surface.

The pressure cooker may also include a second, non-pressurizable, lid sized and shaped to be positionable on the flange outer lip in covering relation with the pan opening such that its top surface is spaced upwardly from the sidewall top edge a sufficient distance to prevent the latching member from being moved into the latched position.

DETAILED DESCRIPTION OF THE PREFERRED EMBODIMENT

Figure 1:
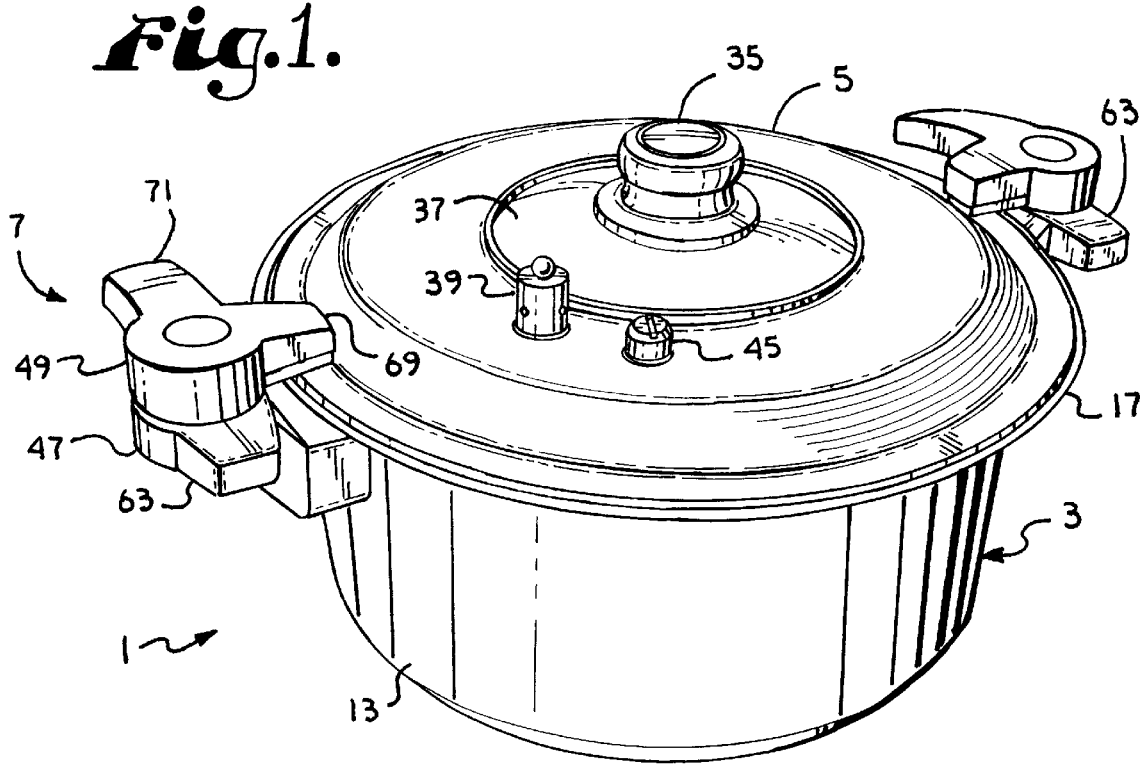
FIG. 1 is a perspective view of a pressure cooker embodying the present invention with the pressure cooker lid in place and the latch handles in the latched position.
Figure 2:
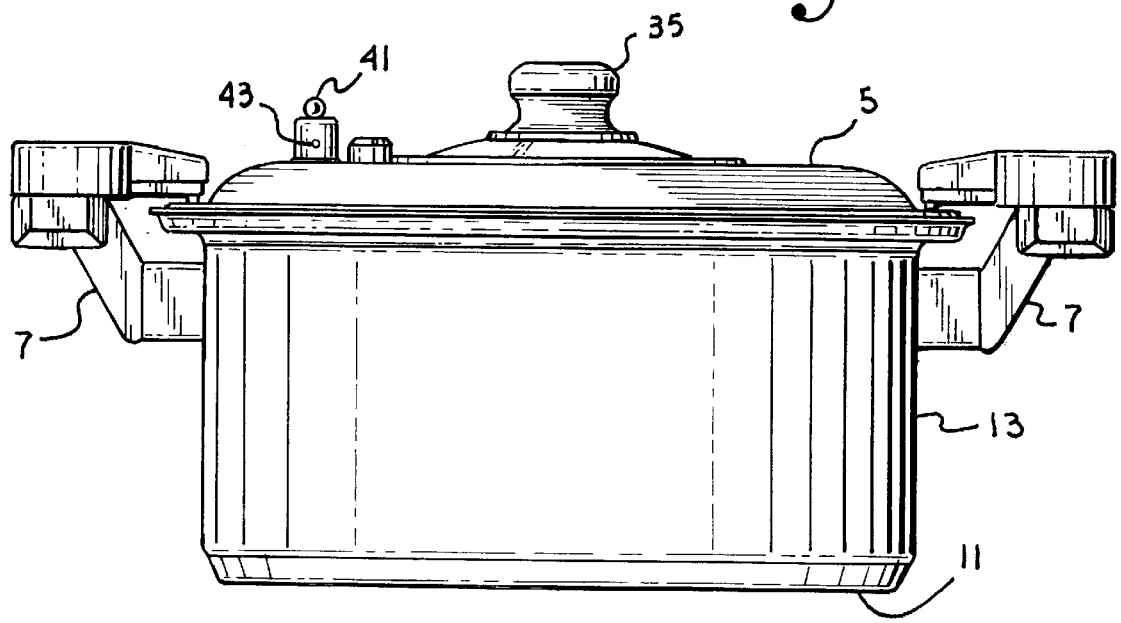
FIG. 2 is a front view of the pressure cooker of FIG. 1.
Figure 3:
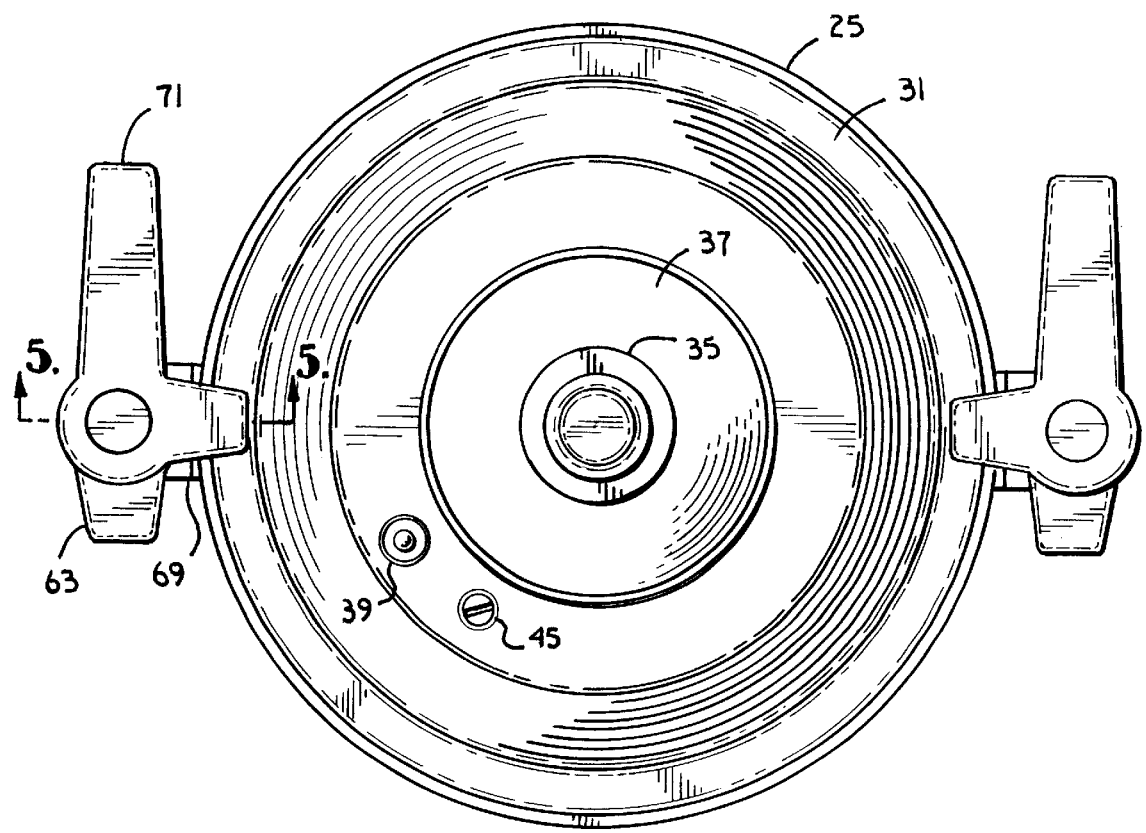
FIG. 3 is a top view of the pressure cooker of FIG. 1.
Figure 4:
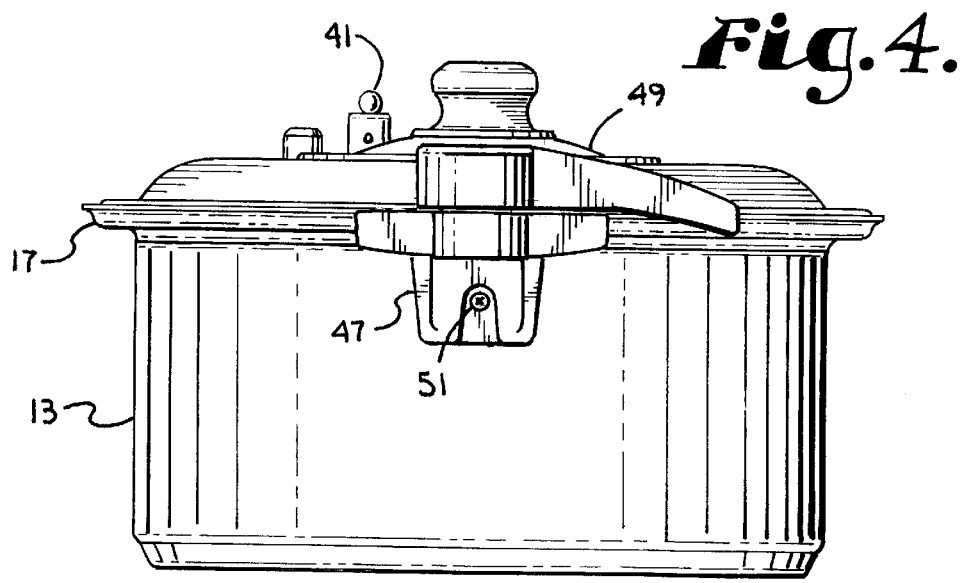
FIG. 4 is an end view of the pressure cooker of FIG. 1.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Objects and advantages of this invention will become apparent from the following description taken in conjunction with the accompanying drawings wherein are set forth, by way of illustration and example, certain embodiments of the invention.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

Referring to the drawings in more detail, the reference number 1 generally designates a pressure cooker embodying the present invention. Referring to FIGS. 1–4, the pressure cooker 1 generally comprises a pan 3, a first or pressure cooker lid 5, and a pair of pivoting latch handles 7 which removably secure the pressure cooker lid 5 to the pan 3. The pan 3 and first lid 5 are preferably constructed of stainless steel. The pressure cooker 1 may further include a second or non-pressurizable lid 9, shown in FIGS. 8 and 9, which is preferably made primarily of glass but may be made of other materials.

Figure 5:
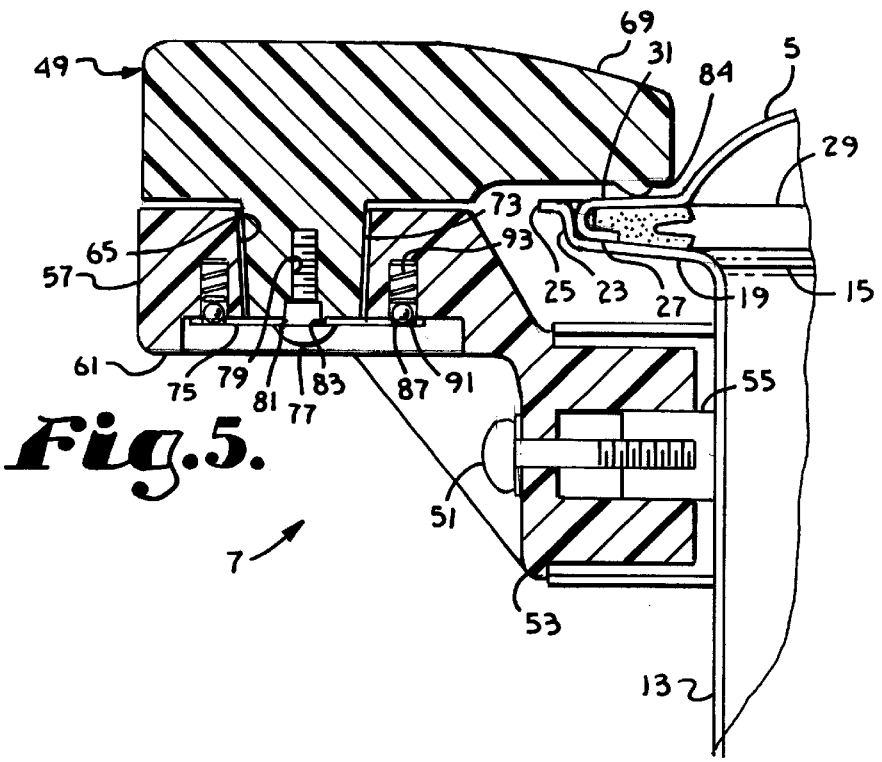
FIG. 5 is a cross-section of one of the latch handles of the pressure cooker in the latched position taken generally along line 5—5 in FIG. 3.
Figure 6:
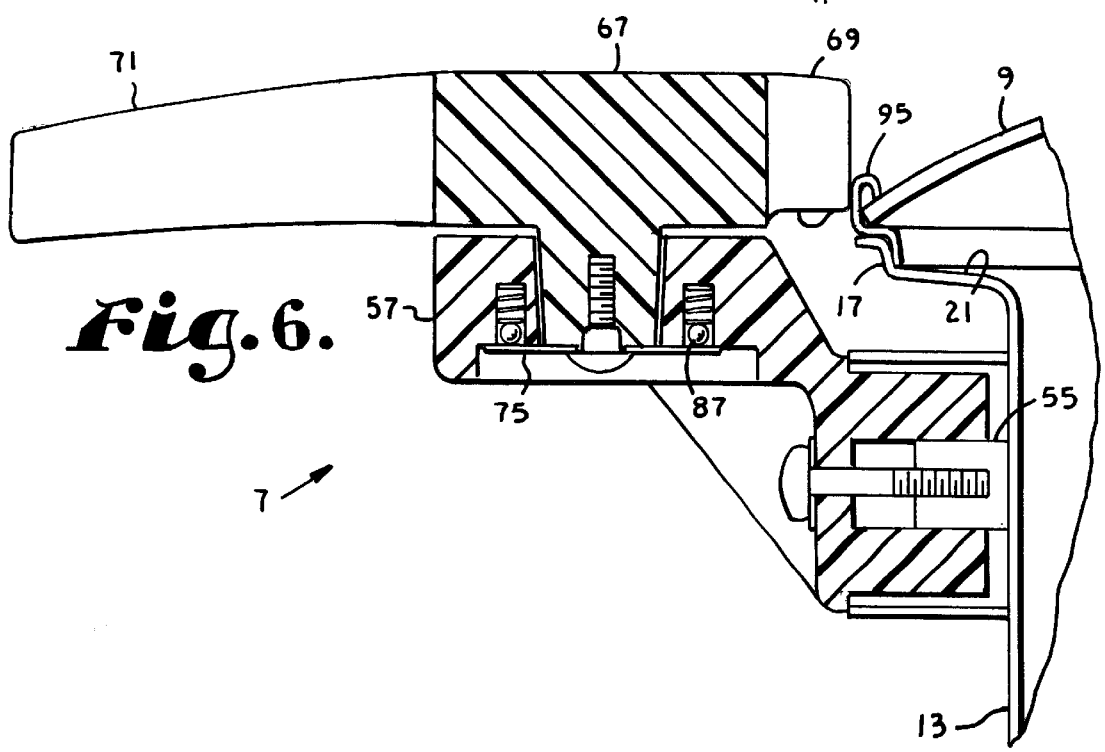
FIG. 6 is a cross-section of one of the latch handles of the pressure cooker in a position intermediate the latched and unlatched positions with the non-pressurizable lid in place.
Figure 7:
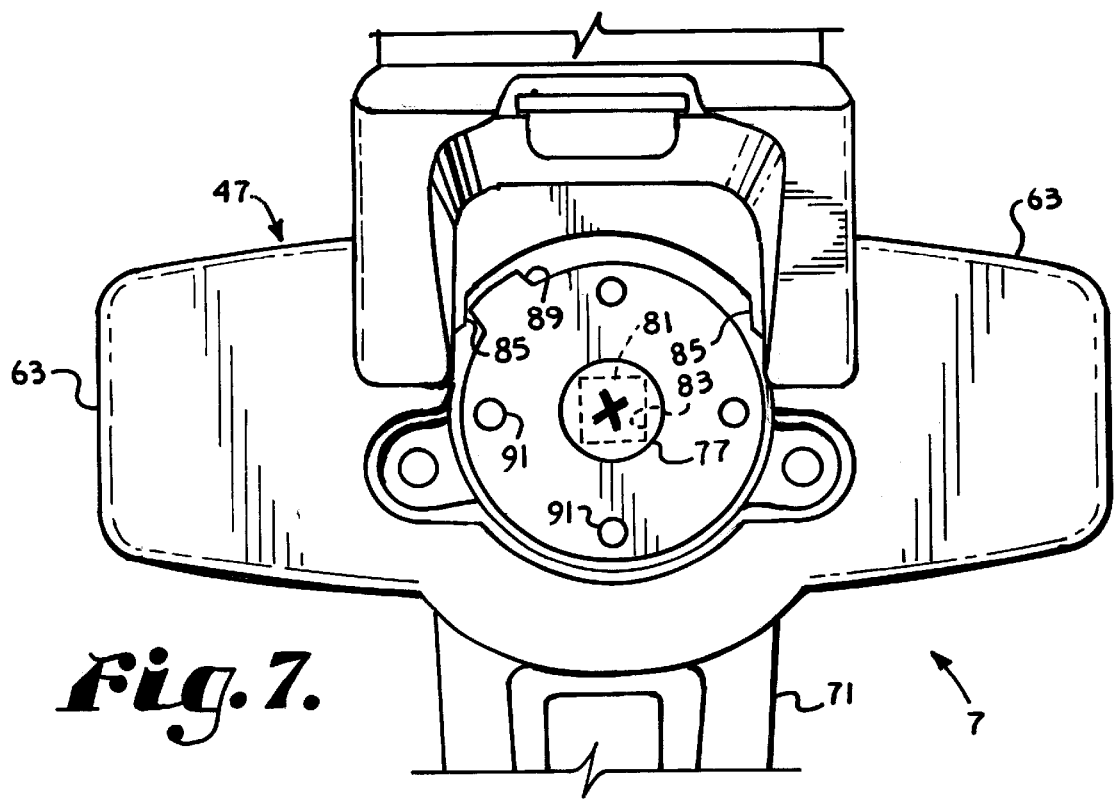
FIG. 7 is a bottom view of one of the latch handles of the pressure cooker showing the pivot plate.

The pan 3 comprises a bottom wall 11 and a generally cylindrical sidewall 13 extending upwardly from the bottom wall 11 to a top opening 15. An annular flange 17 extends generally outwardly from the sidewall 13 proximate the top opening 15. Referring to FIGS. 5 and 6, the flange 17 includes a generally horizontal portion 19 with an upper sealing surface 21. The horizontal portion 19 of the flange 17 extends outwardly to an upwardly projecting rim 23, which terminates in a generally horizontal outer lip 25.

The pressure cooker lid 5 is sized and shaped to engage the upper sealing surface 21 of the flange 17 and has a diameter which allows it to fit concentrically within the upwardly projecting rim 23 as seen in FIG. 5. The lid 5 includes a rolled outer edge 27, which retains an elastomeric sealing ring 29. A flat annular portion 31 is formed on the lid 5 proximate the outer edge 27. The lid 5 domes upwardly from the flat annular portion 31 toward the center of the lid 5. A handle or knob 35 is secured to the lid 5 proximate the center for lifting the lid 5 from the pan 3. The lid 5 may further include a glass window 37 through which one can observe the contents of the cooker 1.

Referring again to FIGS. 1–4, a primary pressure relief valve 39 is provided on the pressure cooker lid 5 for controlling the pressure within the cooker 1. The primary valve 39 includes a weighted plunger 41. Passageways (not shown) within the primary valve 39 communicate with the interior of the lid 5 so that pressure built up within the cooker 1 acts on the underside of the plunger 41. When pressure within the cooker 1 reaches a predetermined set value wherein the upward force acting on the plunger 41 exceeds its weight, the plunger 41 is raised upward. Relief holes 43 extend through the body of the valve 39 at a point, which is above the resting position of the plunger 41, but below its raised position. When the level of the plunger 41 reaches the relief holes 43, pressure is vented from the cooker 1. The plunger 41 may also be manually raised at any time to release the pressure in the cooker 1 by pulling upwardly on the plunger 41. A secondary pressure relief valve 45 is provided on the lid 5 as a fail-safe in case of malfunction of the primary valve 39.

The preferred set point for the primary valve 39 is on the order of 0.1 to 0.6 psig. This is much lower than the 5–15 psig which is common with prior art pressure cookers. The low pressure used in the cooker 1 is sufficient to significantly decrease cooking times over unpressurized cooking methods, but is much safer and less intimidating than the high pressures of prior art pressure cookers. The lower pressure also allows the lid 5 to be safely and easily removed to add ingredients or to stir the contents of the cooker 1.

The pivoting latch handles 7 each include a fixed member 47 which is connected to the outer surface of the pan sidewall 13 and a latching member 49 which is pivotally attached to the fixed member 47. The two latch handles 7 are arrayed at 180 degrees from each other around the circumference of the pan 3 The latch handles 7 are mirror images of each other.

As seen in FIGS. 5 and 6, each latch handle fixed member 47 is secured to the pan 3 by a screw 51 which extends through a generally vertical mounting flange 53 of the fixed member 47 and threadably engages a boss 55 secured to the pan sidewall 13. Each fixed member 47 further includes a generally horizontal shelf 57 with a top surface 59 and a bottom surface 61. The fixed members 47 are oriented on the pan 3 such that the top surface 59 of each shelf 57 is in horizontal alignment with the horizontal lip 25 of the pan flange 17. Each shelf 57 includes a pair of tabs or ears 63 which extend outwardly from the handle fixed member 47 and provide a gripping surface for lifting the cooker 1. The shelves 57 each further include a central receiver 65, which passes through the shelf 57 from the top surface 59 to the bottom surface 61 thereof.

The latching members 49 of the latch handles 7 each include a central portion 67. A latch dog 69 and a pivot handle 71 extend outwardly from each central portion 67 in perpendicular relation to each other. The pivot handles 71 are generally longer than the latch dogs 69 and curve downward slightly. A stub axle 73 extends downwardly from each central portion 67 and is rotatably received by the central receiver 65 of the respective latch fixed member 47. The stub axles 73 are secured within the receivers 65 by pivot plates 75 and screws 77 which extend upwardly through the pivot plates 75 and engage threaded axial receivers 79 in the stub axles 73. Each axial receiver 79 is surrounded by a square collar 81 fixed to the stub axle 73 which engages a respective square hole 83 in the pivot plate 75 such that the pivot plate 75 and stub axle 73 will rotate together.

By grasping the pivot handles 71 of the latch handles 7 and rotating the latching members 49 about the stub axles 73, a cook can selectively bring the latching members 49 into a latched position wherein the latch dogs 69 overlap part of the flat annular portion 31 of the first lid 5, and thereby latch the lid 5 in position relative to the pan 3. The latch dogs 69 may engage the annular portion 31 anywhere around the perimeter of the lid 5, therefore the lid 5 does not have to be in any particular rotational alignment with the pan 3 in order to be latched in position.

Rotating the latching members 49 in the opposite direction moves them into an unlatched position wherein the first lid 5 can be removed from the pan 3. Each of the latch dogs 69 includes a protrusion or glide 84 that extends downwardly therefrom. As the latching members 49 are moved into the latched position, the glides 84 engage the lid 5 and force it downwardly, compressing the elastomeric seal 29, and thereby sealing the cooker 1.

The generally perpendicular relationship between the pivot handles 71 and latch dogs 69 insures that the pivot handles 71 extend outwardly from the cooker 1, away from the top opening 15, when the latching members 49 are in the unlatched position. The consequence of this design feature is that the cook's hands are automatically moved away from the top opening 15 when the latching members 49 are being unlatched, thereby eliminating any risk that the cook will be burned by steam or other hot vapors escaping the cooker 1 through the top opening 15. In the latched position, the pivot handles 71 are arrayed tangentially to the pan sidewall 13 so that they are out of the way, and the cooker 1 takes up less room on top of the stove.

In order to insure that the pivot handles 71 can only be rotated in the manner described above, the latch handles 7 are provided with a system of limit stops 85 and detent balls 87 which are associated with the pivot plates 75. Each pivot plate 75 includes a projection 89, which extends outwardly from the edge of the generally circular pivot plate 75. The projection 89 moves between a pair of limit stops 85 as the latching member 49 is rotated. The limit stops 85 are formed in the respective latch handle fixed member 47 and are spaced such that the pivot plate 75 and its attached latching member 49 are limited to a ninety degree range of movement between the latched and unlatched positions.

Each pivot plate 75 further includes four detent holes 91 arranged every ninety degrees on the pivot plate 75. A pair of spring loaded detent balls 87 are located in receivers 93 in the respective handle fixed member 47. The receivers 93 are spaced 180 degrees apart and are positioned so that the detent balls 87 engage two of the detent holes 91 when the latching member 49 is in the latched position and to engage the other two detent holes 91 when the latching member 49 is in the unlatched position. The action of the detent balls 87 on the detent holes 91 holds the latching member 49 securely in either the latched or unlatched position until the pivot handle 71 is intentionally rotated by the cook, and provides a clearly felt indication that the latch handle 7 is either filly latched or unlatched. Furthermore, as the latching member 49 is rotated between the latched and unlatched positions, the detent balls 87 bear against the pivot plate 75 and provide for smooth movement of the latching member 49, even when the cooker 1 is under pressure.

Figure 8:
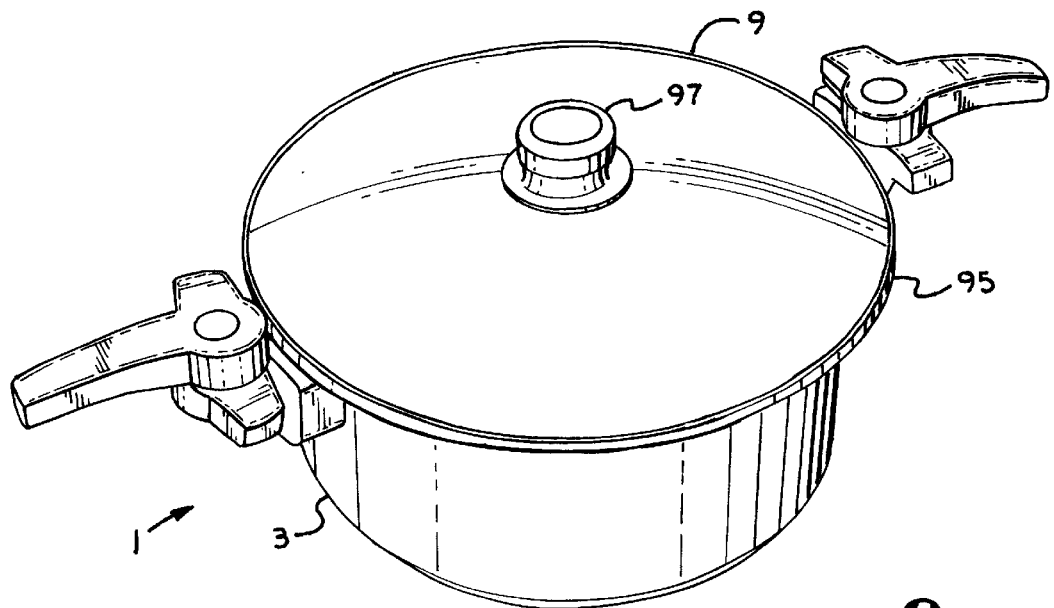
FIG. 8 is a perspective view of the pressure cooker with the non-pressurizable lid in place and the latch handles in the unlatched position.
Figure 9:
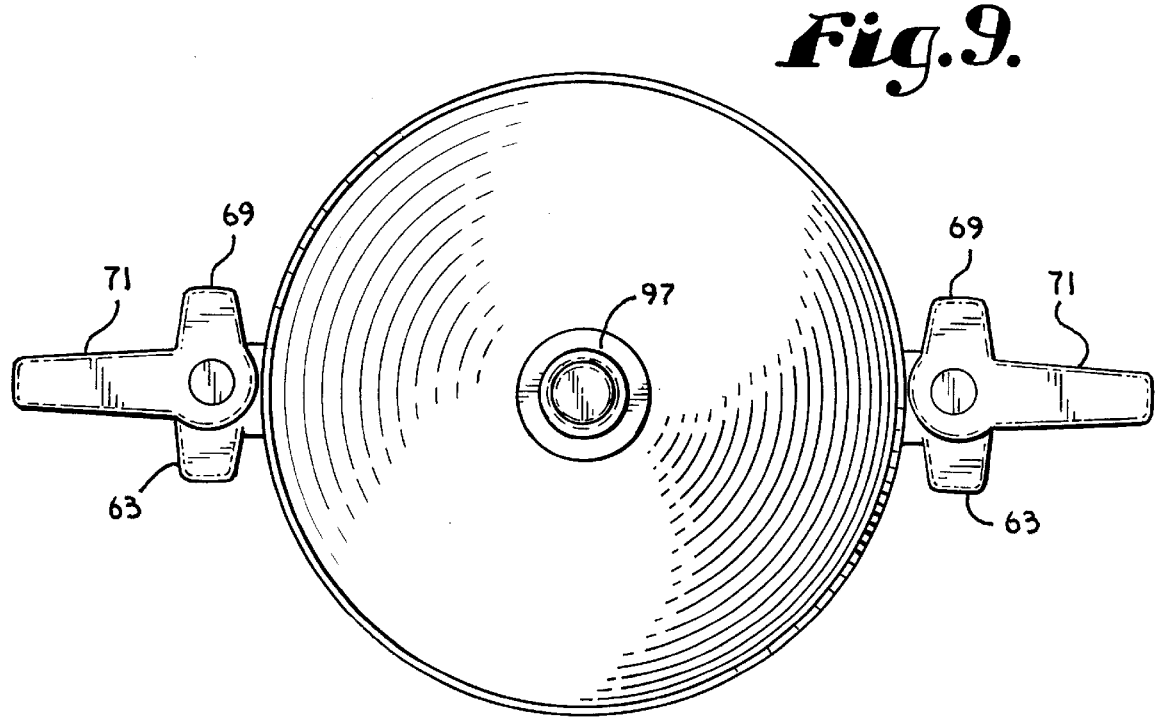
FIG. 9 is a top view of the pressure cooker of FIG. 8.

While there are distinct advantages to cooking under pressure, there may be times when a cook would want to use the cooker 1 for other purposes, such as for keeping food warm, re-warming already cooked food, or for simmering. In these and other similar situations the cook may want to use the second lid 9 instead of the pressure cooker lid 5. The second lid 9 may be lighter in weight and therefore easier to handle than the first lid 5. The second lid 9 is preferably made of a transparent material such as glass so that the cook may more easily observe the food in the cooker, however transparency is not an essential feature of the second lid 9 and lids made of opaque materials are considered to be within the scope of the present invention. A preferred embodiment of the second lid 9 is shown in FIGS. 8 and 9 as being composed primarily of glass and having a stainless steel edge bezel 95 and a centrally located lift knob or handle 97.

It is imperative when using the lid 9 that the latching members 49 remain in the unlatched position. The lid 9 does not include a pressure relief valve, and heating the cooker 1 with the lid 9 latched in position could result in an explosion. In order to prevent this potentially dangerous situation, the lid 9 is designed such that it cannot be latched in place using the latching members 49. A shown in FIG. 6, the lid 9 is of an overall diameter which is large enough that the entire lid 9 cannot sit down within the vertical rim 23 of the pan flange 17. Instead, the bezel 95 of the lid 9 sits at least partially on top of the horizontal lip 25 of the flange 17. This higher positioning of the lid 9 gives it an effective thickness relative to the flange 17, which prevents the latching members 49 from being latched. Alternatively, the lid 9 could be constructed with a diameter equal to that of the lid 5, but with an actual thickness sufficient to prevent the latching members 49 from being moved into the latched position.

It is to be understood that while certain farms of the present invention have been illustrated and described herein, it is not to be limited to the specific forms or arrangement of parts described and shown. For example, the cooker 1 has been described herein as being generally cylindrical in shape with round lids 5 and 9, however cookers of other general shapes, such as rectangular or oval shapes are considered to be within the scope of the present invention. Furthermore, while the cooker 1 has been described as having two pivoting latch handles 7, it is foreseen that cookers having more or fewer such handles 7, either acting alone or in combination with other closure devices such as hinges, could be produced according to the present invention. It is also to be understood that while the elastomeric sealing ring 29 has been described herein as being attached to the pressure cooker lid 5, it could instead be either a seperate part or attached to the pan 3. The edge of the sealing ring 29 may also extend down the sidewall 13 of the pan 3.

What is claimed and desired to be secured by letters patent is as follows:

1. A cooker comprising:
    a) a pan having a bottom wall, and a sidewall extending upward from said bottom wall to a top edge, said top edge defining a pan opening;
    b) a first lid sized and shaped to be positionable on said sidewall top edge in covering relation with said pan opening; and
    c) a latch handle having a fixed member secured to said sidewall proximate said top edge and a latching member attached to said fixed member and pivotable about a generally vertical axis, said latching member including a latch dog and a pivot handle graspable by a user to pivot said latching member between a latched position wherein said latch dog overlaps a portion of said first lid positioned in covering relation with said pan opening and an unlatched position, said pivot handle being oriented generally perpendicularly to said latch dog.

2. The cooker as in claim 1 wherein said pivot handle extends outwardly from said pan sidewall away from said pan opening when said latching member is in the unlatched position.

3. The cooker as in claim 1 wherein:
    a) said sidewall top edge includes an upper sealing surface;
    b) said first lid includes an outer edge and a pressure relief valve;
    c) an elastomeric seal is positioned between said first lid outer edge and said sidewall upper sealing surface;
    d) said latch dog includes a glide protruding downwardly therefrom; and
    e) said glide engages said first lid positioned in covering relation with said pan opening as said latching member is moved into the latched position and pushes said first lid downwardly forcing said elastomeric seal into sealing engagement with said sealing surface.

4. The cooker as in claim 1 and further including a second lid sized and shaped to be positionable on said sidewall top edge in covering relation with said pan opening, said second lid having a thickness sufficient to prevent said latching member from being moved into the latched position.

5. The cooker as in claim 1 and further including a second lid having a top surface and sized and shaped to be positionable on said sidewall top edge in covering relation with said pan opening such that said top surface is spaced upwardly from said sidewall top edge a sufficient distance to prevent said latching member from being moved into the latched position.

6. The cooker as in claim 1 wherein said latching member is attached to said fixed member by a stub axle extending downwardly from said latching member and rotatably engaging a cylindrical receiver in said fixed member.

7. The cooker as in claim 6 wherein said stub axle includes a lower end in register with a lower surface of said fixed member, said stub axle being retained within said cylindrical receiver by a pivot plate secured to said stub axle lower end and overlapping said fixed member lower surface.

8. The cooker as in claim 7 wherein said pivot plate includes a plurality of detent holes and said fixed member has a spring loaded detent ball mounted therein such that such that said detent ball engages one of said detent holes when said latching member is in the latched position and another of said detent holes when said latching member is in the unlatched position.

9. The cooker as in claim 8 wherein there are two of said spring loaded detent balls oriented 180 degrees apart, said pivot plate has four of said detent holes, and said detent balls engage two of said detent holes when said latching member is in the latched position and the other two of said detent holes when said latching member is in the unlatched position.

10. The cooker as in claim 9 wherein said detent balls bear against an upper surface of said pivot plate as said latching member is moved between the latched and unlatched positions and thereby prevent said latch handle from binding.

11. A pressure cooker comprising:
   a) a pan having a bottom wall, and a sidewall extending upward from said bottom wall to a top edge, said top edge defining a pan opening and including a flange extending outwardly from said sidewall, said flange including an upper sealing surface;
   b) a pressure cooker lid sized and shaped to be positionable on said sidewall flange in covering relation with said pan opening, said pressure cooker lid having an outer edge;
   c) an elastomeric seal is positioned between said first lid outer edge and said sidewall flange upper sealing surface;
   d) a latch handle having a fixed member secured to said sidewall proximate said top edge and a latching member attached to said fixed member and pivotable about a generally vertical axis, said latching member including a latch dog and a pivot handle graspable by a user to pivot said latching member between a latched position wherein said latch dog overlaps a portion of said first lid positioned in covering relation with said pan opening and an unlatched position, said pivot handle being oriented generally perpendicularly to said latch dog, said latch dog including a glide depending therefrom, said glide engaging said pressure cooker lid positioned in covering relation with said pan opening as said latching member is moved into the latched position and pushing said pressure cooker lid downwardly, forcing said elastomeric seal into sealing engagement with said sealing surface.

12. The cooker as in claim 11 wherein said latching member is attached to said fixed member by a stub axle extending downwardly from said latching member and rotatably engaging a cylindrical receiver in said fixed member.

13. The cooker as in claim 12 wherein said stub axle includes a lower end in register with a lower surface of said fixed member, said stub axle being retained within said cylindrical receiver by a pivot plate secured to said stub axle lower end and overlapping said fixed member lower surface.

14. The cooker as in claim 13 wherein said pivot plate includes a plurality of detent holes and a spring loaded detent ball is mounted in said fixed member such that said detent ball engages one of said detent holes when said latching member is in the latched position and another of said detent holes when said latching member is in the unlatched position.

15. The cooker as in claim 14 wherein there are two of said spring loaded detent balls oriented 180 degrees apart, said pivot plate has four of said detent holes, and said detent balls engage two of said detent holes when said latching member is in the latched position and the other two of said detent holes when said latching member is in the unlatched position.

16. The cooker as in claim 15 wherein said detent balls bear against an upper surface of said pivot plate as said latching member is moved between the latched and unlatched positions and thereby prevent said latch handle from binding.

17. The cooker as in claim 11 and further including a second lid having a top surface and sized and shaped to be positionable on said sidewall top edge in covering relation with said pan opening such that said top surface is spaced upwardly from said sidewall top edge a sufficient distance to prevent said latching member from being moved into the latched position.

18. A pressure cooker comprising:
   a) a pan having a bottom wall, and a sidewall extending upward from said bottom wall to a top edge, said top edge defining a pan opening and including a flange extending outwardly from said sidewall, said flange including an upper sealing surface and an outer lip spaced upwardly from said upper sealing surface;
   b) a pressure cooker lid sized and shaped to be positionable on said sidewall flange in covering relation with said pan opening, said pressure cooker lid having an outer edge;
   c) an elastomeric seal is positioned between said first lid outer edge and said sidewall flange upper sealing surface;
   d) a latch handle having a fixed member secured to said sidewall proximate said top edge and a latching member including a latch dog, said latching member being attached to said fixed member and pivotable about a generally vertical axis between a latched position wherein said latch dog overlaps a portion of said pressure cooker lid positioned in covering relation with said pan opening and an unlatched position, said latching member including a glide depending from said latch dog, said glide engaging said pressure cooker lid positioned in covering relation with said pan opening as said latching member is moved into the latched position and pushing said pressure cooker lid downwardly, forcing said elastomeric seal into sealing engagement with said sealing surface; and
   e) a second lid having a top surface and sized and shaped to be positionable on said flange outer lip in covering relation with said pan opening such that said top surface is spaced upwardly from said sidewall top edge a sufficient distance to prevent said latching member from being moved into the latched position.

19. A latch handle assembly to removably secure the lid of a cooker having at least one sidewall, comprising:
   a) a bottom fixed member secured to a sidewall of the cooker; and b) a latching member rotatably connected to and spaced above said bottom fixed member, said latching member having a latch dog extending laterally outward therefrom and a pivot handle oriented generally perpendicularly to said latch dog; wherein c) said latching member can be rotated such that said latch dog is in moveable contact with the top of the lid to secure the lid to the cooker or rotated clear of the lid to allow removal of the lid from the cooker.

20. A sealing apparatus for a cooker having an opening and at least one sidewall, comprising:

a) a first lid positionable in covering relation over the cooker opening; and b) a bottom fixed member secured to a side wall of the cooker; and c) a latching member rotatably connected to and spaced above said bottom fixed member, said latching member having a latch dog extending laterally outward therefrom and a pivot handle oriented generally perpendicularly to said latch dog; wherein d) said latching member can be rotated such that said latch dog contacts the top of said first lid to secure said first lid in position when said first lid is positioned over the cooker opening.

21. The sealing apparatus as in claim 20, and further including a second lid interchangeable with said first lid, wherein said latching member is prevented from being rotated to secure the second lid in position when said second lid is positioned over the opening.

22. The sealing apparatus as in claim 21 wherein said first lid engages the cooker sidewall at a first flange and said second lid engages the cooker sidewall at a second flange spaced upwardly from the first flange.

23. A cooker comprising:

a) a pan having a bottom wall, and a sidewall extending upward from said bottom wall to a top edge, said top edge defining a pan opening;

b) a first lid sized and shaped to be positionable on said sidewall top edge in covering relation with said pan opening; and c) a latch handle having a fixed member secured to said sidewall proximate said top edge and a latching member attached to said fixed member and pivotable about a generally vertical axis, said latching member including a latch dog and a pivot handle graspable by a user to pivot said latching member between a latched position wherein said latch dog overlaps a portion of said first lid positioned in covering relation with said pan opening and an unlatched position, said pivot handle extending outwardly from said pan sidewall away from said pan opening when said latching member is in the unlatched position.

24. A cooker comprising:

a) a pan having a bottom wall, and a sidewall extending upward from said bottom wall to a top edge, said top edge defining a pan opening;

b) a first lid sized and shaped to be positionable on said sidewall top edge in covering relation with said pan opening; and c) a latch handle having a fixed member secured to said sidewall proximate said top edge and a latching member attached to said fixed member and pivotable about a generally vertical axis, said latching member including a latch dog and a pivot handle graspable by a user to pivot said latching member between a latched position wherein said latch dog overlaps a portion of said first lid positioned in covering relation with said pan opening and an unlatched position; wherein d) said latching member is attached to said fixed member by a stub axle extending downwardly from said latching member and rotatably engaging a cylindrical receiver in said fixed member such that a lower end of said stub axle is in register with a lower surface of said fixed member, said stub axle being retained within said cylindrical receiver by a pivot plate secured to said stub axle lower end and overlapping a portion of said fixed member lower surface, said pivot plate including a plurality of detent holes, said fixed member having a spring loaded detent ball mounted therein such that said detent ball engages one of said detent holes when said latching member is in the latched position and another of said detent holes when- said latching member is in the unlatched position.

25. The cooker as in claim 24 wherein there are two of said spring loaded detent balls oriented 180 degrees apart, said pivot plate has four of said detent holes, and said detent balls engage two of said detent holes when said latching member is in the latched position and the other two of said detent holes when said latching member is in the unlatched position.

26. The cooker as in claim 25 wherein said detent balls bear against an upper surface of said pivot plate as said latching member is moved between the latched and unlatched positions and thereby prevent said latch handle from binding.

* * * * *